July 30, 1968     N. O. CROSS     3,394,586

DELAY LINE FOR ULTRASONIC TESTING INSTRUMENT

Filed Aug. 14, 1964

Newbold O. Cross     Inventor

By     *[signature]* Attorney

United States Patent Office 3,394,586
Patented July 30, 1968

3,394,586
DELAY LINE FOR ULTRASONIC TESTING INSTRUMENT
Newbold O. Cross, Berkeley Heights, N.J., assignor to Esso Research and Engineering Company, a corporation of Delaware
Filed Aug. 14, 1964, Ser. No. 389,675
6 Claims. (Cl. 73—71.5)

ABSTRACT OF THE DISCLOSURE

An ultrasonic transducer having an elastomer coupling element which is peripherally restrained, and contains a finely divided filler material.

Figure 1:
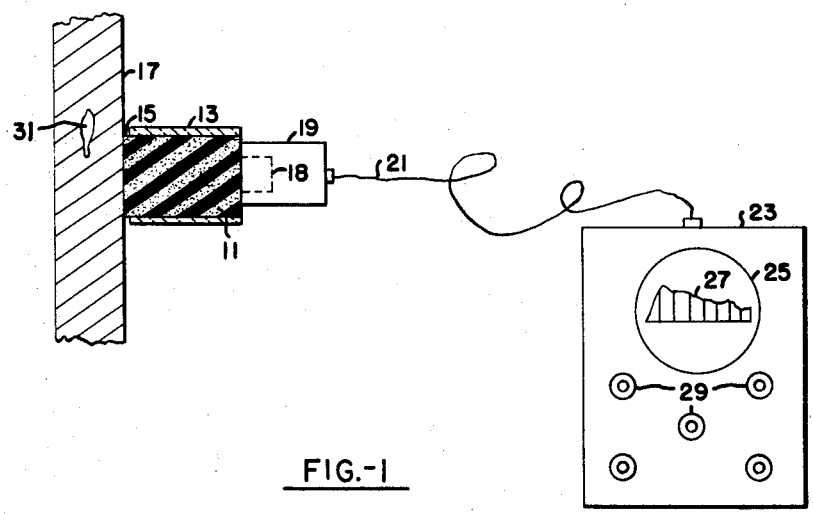

The present invention relates to a delay line for an ultrasonic testing instrument. More particularly, it relates to an elastic delay line adapted to transmit and retransmit pulses and reflected pulses from an ultrasonic pulse generator to and from a structural material which is to be tested for flaws, thin spots, and other irregularities and abnormalities.

The invention has particular application to instruments of the general type described in U.S. Patent No. 2,280,226, although not limited thereto. Other examples of instruments of a generally suitable type are those disclosed in U.S. Patent No. 2,592,134 and in U.S. Patent No. 2,913,602.

The prior art has shown that supersonic waves may be transmitted into solid material and from there transmitted or reflected in various ways and directions for measurement at suitable points or intervals. The signals so transmitted are useful to indicate irregularities, discontinuities, fissures, flaws, points of erosion and the like within structural elements. Such a testing device is particularly useful for examination of pressure vessels, particularly those operating at high temperatures. Examples of such equipment are chemical processing plants, petroleum treating vessels, distillation towers and various other analogous structures which are widely used in industry. In cases where such vessels are operated under pressure, it is obviously highly desirable, and frequently is absolutely essential, to be able to obtain accurate indications of incipient flaws, pits and areas of corrosion or erosion which might lead to damage or even ultimate failure with consequent serious results.

By generating supersonic waves, by known means, and transmitting them into or against a metal part, such waves may be in part transmitted further and in part reflected. By generating and reflecting suitable wave forms and pulses, analagous in some respects to radar surveillance, various indications may be obtained as to the nature and condition of structures hidden within or beneath the part being contacted. By testing a metal part, for example, a steel pressure vessel, by applying the testing instrument to its surface at various points, comparisons may be made between various parts of the structure. Thereby those parts or areas showing abnormalities, or indicating flaws, thin spots, etc., may be readily and accurately located.

As indicated in the prior art of which the patents mentioned above are only exemplary, waves may be generated which, upon striking certain solid parts, e.g. of a metal structure, may be changed into other forms of waves or reflections of waves. The direction and intensity of the resultant or reflected waves, from various positions and attitudes, may be surveyed or measured to gain an indication of the underlying nature of the structure. For example, when a supersonic wave is transmitted into a metal part in a direction at right angles with the surface, the result may be to set up a series of reflected or standing waves. These are caused by repeated reflections in appropriate sequence of the wave from the incident surface of the solid part being tested, as is well understood in the art. These standing or reflected waves depending on phase, may or may not interfere with other waves arriving at the detector. The result is to indicate by nullification or amplification, the relative energy absorbing or reflecting properties of the metal part being tested.

In some cases, with devices of the prior art, the reflected waves tend to obscure and nullify the desired indications because of undesirable fluctuations. In part, this is due to difficulty of transmission and retransmission which is due, in turn, to the types of materials used as carriers or transmitters for the wave energy. Various attempts have been made in the prior art to obtain the desired types of transmission. For example, liquids or liquids containing particulate metals and the like have been used. Water has been used as the transmission medium in some cases. It works reasonably well in many instances. However, to take the case of petroleum processing vessels as an example, water is not satisfactory. In such vessels and in other structures operating at relatively high temperatures, often above the boiling point of water, it is obviously not feasible to conduct prolonged or extensive tests by the use of water which must actually contact the surface under study. Water evaporates rapidly, due to the temperature of the material being contacted.

Hence, one purpose of the present invention is to devise a delay line or transmission line for ultrasonic vibrations and waves, which is not limited by the temperature at the surface of the parts to be tested. Moreover, where liquids are to be used in direct contact with the surface, the water or other liquid material may not always be available. In using any liquid as a transmission medium, there is always a certain amount of loss in establishing and maintaining the desired contact. In fact, a continuous flow of liquid to the test site usually is needed. In a typical prior art device, water is supplied to a tubular transmitter with an open end of the tube being pressed against the surface being studied. Such surfaces are often too hot and the water is converted to steam. In any case, such procedure results in loss of water and inconvenience as well as having other obvious disadvantages.

According to the present invention, instead of using a transmission line of liquid, such as water, an organosilicon elastomer, suitably modified, is used as the essential delay line transmission element. This may be, and preferably is, a mass of polysiloxane elastomer, preferably confined laterally so as to cause its most important vibrations to move along its axis. For example, the structure may be in the form of a cylinder of the elastomer material. This solid cylinder is substantially confined against lateral expansion and contraction by a non-yielding or relatively inelastic retaining structure circumferentially surrounding it. This lateral restraint of the elastomer reduces ultrasonic wave losses from the elastomer material in the lateral direction and thereby improves the wave transmissibility longitudinally therethrough in the direction of the primary wave propagation. The retaining structure may be any suitable material of good structural strength. A fiber glass sleeve or cover impregnated with a suitable resin and suitably temperature resistant for the use intended is very satisfactory. In the case of testing petroleum cracking vessels, for example, temperatures of some hundreds of degrees, i.e. up to 1000° F., or more may be encountered. For such purposes, materials such as asbestos cement sleeve covers or the like may be desirable.

The organic silicon elastomer for purposes of the present invention is preferably provided with a finely divided inorganic filler to improve its response to ultarsonic vibration. A preferred filler for polysiloxane elastomer is finely divided silica in proportions which may range from 2 to 100 percent by weight based on the mass of the polymer itself.

In operation, a wave generator or transducer operating pulsewise to obtain reflected or standing waves, generates a short series of signals. The standing wave results from the phase of reflection. The resultant wave form is indicated on a suitable instrument, such as an oscillograph. Repetition of the pulses may be at any desired frequency, e.g. at intervals from 100 to 10,000 or more pulses per second. A particularly desirable operating range is within the limits of about 500 to 1000 pulses per second.

When the pulse signals strike the surface under test, their reflections make a visual signal or indication on the screen of the oscilloscope. Part of the energy reflected then returns to the metal surface and a second return makes a second vertical pip on the screen of the indicating instrument. A series of such pips is then produced simultaneously, the resulting graph actually showing a continuation or a train of such pips. With a little experience and training the user can read the thickness as a function of the form, i.e. the time-velocity curve of the wave. This form is clearly indicated on the oscillograph screen, being the graphical representation of the reflected standing wave.

While the apparatus of the present invention most frequently is designed primarily for measuring thickness of vessel walls, etc., it has other uses also. Without the delay line, the pulses follow so immediately that there is no opportunity to make comparable measurements. Hence the delay line is used to produce a measurable or visible signal, according to the present invention.

The invention will be more fully understood by reference to the accompanying drawings and the detailed description which illustrate presently preferred specific embodiments of the invention.

FIGURE 1 shows, partly diagrammatically and partly in section, a system including the delay line transmission element. This element includes a mass of polysiloxane elastomer. This material has more or less the consistency and elastic properties of moderately soft rubber. The elastomer mass is indicated at 11. This mass as shown is preferably in the form of a right circular cylinder although it may assume other shapes. It is surrounded through most of its length by a confining tubular cover or sheath 13 of glass fiber impregnated with a high melting and high softening point resin. Any resin capable of withstanding fairly high temperatures, e.g. 300° F. or more, may be used, such as Bakelite or other resins of good heat resistance such as tetrafluoroethylene may be used, or even nylon, or the polyolefin materials where temperature requirements are not too high. The sheath 13 does not completely cover the cylinder of elastomer for its entire length. It leaves a small length 15, preferably of only a small fraction of an inch, such as $\frac{1}{32}$ to $\frac{1}{8}$ inch, protruding. This is adapted for pressing against the surface of a structural member 17 which is to be tested. The sheath is cut back so that the elastomer only will contact the surface. It is undesirable to have the sheath 13 in actual contact with the surface being studied, since this would distort the signal on the oscillograph. The elastomer mass 11 is mounted in any suitable way, as by cementing to a base or by a protruding tongue 18 extending into a base, shown here as a metal cylinder 19. Cylinder 19 is connected by suitable electrical connections 21 to the instrument or oscillograph 23. The latter has a screen 25 upon which a visible image 27 may be projected. Control knobs, etc., are conventional and are not described, being indicated generally only at 29.

Assuming that the structural member 17 is generally homogeneous, but contains a flaw 31, the mass 11 would be pressed against various points of its surface and operated at intervals while watching the screen 25 to note variations in the signal 27. As the test piece is placed over the point where a flaw occurs, such as indicated at 31, the oscillograph shows a different pattern indicating a different type of reflection due to the hollow character of the structure. This can be readily noted and brought under proper surveillance for repair or replacement if necessary.

Figure 2:
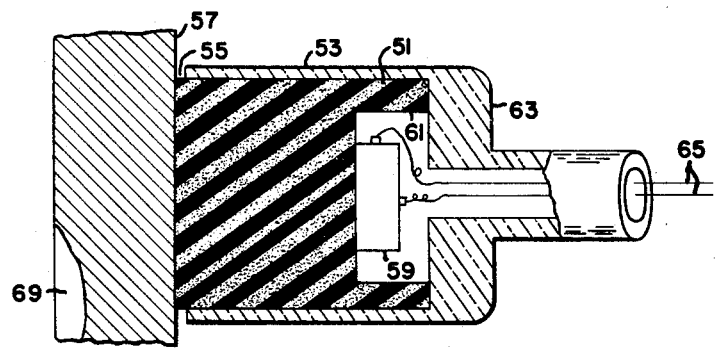

Referring to FIGURE 2, the structure shown therein is generally similar to that of FIGURE 1. The elastomeric mass 51, preferably of polysiloxane rubber, is loaded or filled with finely divided silica. The latter comprises preferably about 25 to 50 percent of the weight of the elastomer. However, more or less silica may be used. within the limits previously indicated. The mass 51 is confined laterally for primary vibration or transmission by a sheath 53 of the same character as sheath 13, shown in FIGURE 1. The elastomer delay line material also protrudes from the sheath a short distance as indicated at 55, being adapted to be pressed without sheath interference against the surface of a specimen or area to be tested, indicated at 57. In this case, a transducer element 59 is inserted in a recess 61 in the back of the elastomeric mass 51, being enclosed by a suitable base or body structure 63 within which the electric lines 65 are housed. The latter conduct the signal to the oscillograph as in FIGURE 1.

The specimen 57 may or may not have flaws therein. For purposes of illustration an abnormality is indicated at 69 as a thin spot worn away by erosion or other operating factors within the structure. If the structure is a pressure vessel operating under severe pressure and/or temperature conditions, an erosion such as 69 could be very serious, as could be the flaw 31 of FIGURE 1.

It will be understood that the structures shown and described herein may be modified in various ways. It is highly desirable that the elastomer contain the finely divided inorganic filler to modify its transmitting properties. In lieu of silica, other minerals or finely divided particulate carbons may be used. Delay line materials of the character described are capable of a much more suitable delay time period for analytical purposes than would be the case for a metal bar or other solid or highly rigid transmission line materials.

It is intended by the claims which follow to cover the invention, in purpose and spirit, as broadly as the prior art properly permits. This includes covering various obvious variations such as would suggest themselves to one skilled in the art.

What is claimed is:

1. In an ultrasonic testing device wherein supersonic waves are transmitted and reflected between a transducer and a body of material to be tested, the improvement which comprises an ultrasonic delay line having one end in direct contact with said transducer and its opposite end arranged for direct contact with said body of material to be tested, said delay line including a mass of elastomer and finely divided inorganic filler means dispersed therein for enhancing the ultrasonic vibration response of said elastomer, and means substantially surrounding the entire length of said delay line between said transducer and body of material to be tested, said last mentioned means being substantially non-yielding and acting as a lateral retainer to enhance unidirectional transmission of supersonic waves through said delay line.

2. A device according to claim 1 wherein the inorganic filler is silica and said elastomer is polysiloxane.

3. An ultrasonic transducer for measuring the physical properties of materials comprising a transducer element for generating ultrasonic energy waves, a wave transmission element comprising a generally cylindrical mass of polysiloxane elastomer, means securing said transducer element in direct contact with one end of said cylindrical mass, and an annular restraining means surrounding substantially the entire periphery of said cylindrical mass, the end of said cylindrical mass opposite the wave transmission element extending a short distance beyond the terminal edge of said annular restraining means.

4. A transducer in accordance with claim 3 including finely divided inorganic filler means dispersed within said wave transmission element for enhancing the ultrasonic vibration response of said elastomer.

5. A transducer in accordance with claim 4 wherein said filler means comprises silica.

6. A transducer in accordance with claim 5 wherein said silica comprises approximately 25 to 50 percent of the weight of said elastomer.

References Cited

UNITED STATES PATENTS

| | | | |
|---|---|---|---|
| 3,315,520 | 4/1967 | Carnevale et al. | 73—71.5 X |
| 2,602,101 | 7/1952 | Mesh | 73—71.5 |
| 3,114,258 | 12/1963 | Stebbins et al. | 73—67.9 |
| 3,220,248 | 11/1965 | Wood | 73—67.9 |
| 3,242,723 | 3/1966 | Evans | 73—67.9 |

OTHER REFERENCES

A text "Silicones" by Fordham published by William Clownes and Sons, Limited, London, England, 1960, pp. 198–9 and 209. (Copy in Group 140, Callaghan.)

JAMES J. GILL, *Primary Examiner.*